No. 727,345. PATENTED MAY 5, 1903.
J. F. GENT.
SETTLING DEVICE.
APPLICATION FILED SEPT. 26, 1902.
NO MODEL.

No. 727,345. Patented May 5, 1903.

UNITED STATES PATENT OFFICE.

JOSEPH F. GENT, OF MOUNT CLEMENS, MICHIGAN, ASSIGNOR OF TWO-THIRDS TO THOMAS T. GAFF, OF BARNSTABLE, MASSACHUSETTS.

SETTLING DEVICE.

SPECIFICATION forming part of Letters Patent No. 727,345, dated May 5, 1903.

Application filed September 26, 1902. Serial No. 124,995. (No model.)

*To all whom it may concern:*

Be it known that I, JOSEPH F. GENT, a citizen of the United States, residing in Mount Clemens, in the county of Macomb, State of Michigan, have invented a new and useful Settling Device, of which the following is a specification.

The device which is the subject of this application is designed with special view to its use in connection with the process of and apparatus for purifying brine set forth in the two applications for Letters Patent of even date herewith made in the names of Thomas T. Gaff and myself jointly. The brine itself is used as a gravity-bath wherein the heavy starchy portions of crushed or broken Indian corn are separated from the germs, as set forth in the patent of Thomas T. Gaff, No. 687,219, of November 26, 1901. The aim of the process and apparatus described in the two aforesaid applications is to keep this brine sufficiently pure and free from residual starchy and glutinous matter to fit it for continued use in the bath, to which end the bath is connected with piping at its inlet and its outlet or overflow, forming a continuous-circulation circuit through which the brine by a rotary power-driven pump or other suitable instrumentality is caused to flow in continuous current into, through, out from, and back into the bath. After the brine leaves the bath and before it returns thereto it is subjected to the action of means by which the residual starchy and glutinous matter in the brine is separated out and carried off from the same, these means being interposed in the pipe or circulation-circuit and acting upon the brine while the latter is in movement.

My invention relates to the means referred to; and it consists of a settling device whose novel structural characteristics will be described in connection with the accompanying drawings, forming part of this specification, and will then be more particularly pointed out in the claim.

Figure 1:
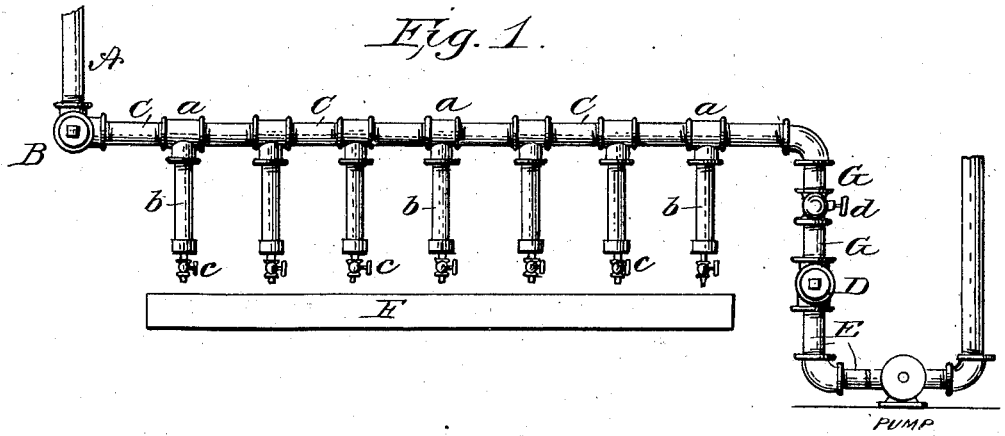
Figure 2:
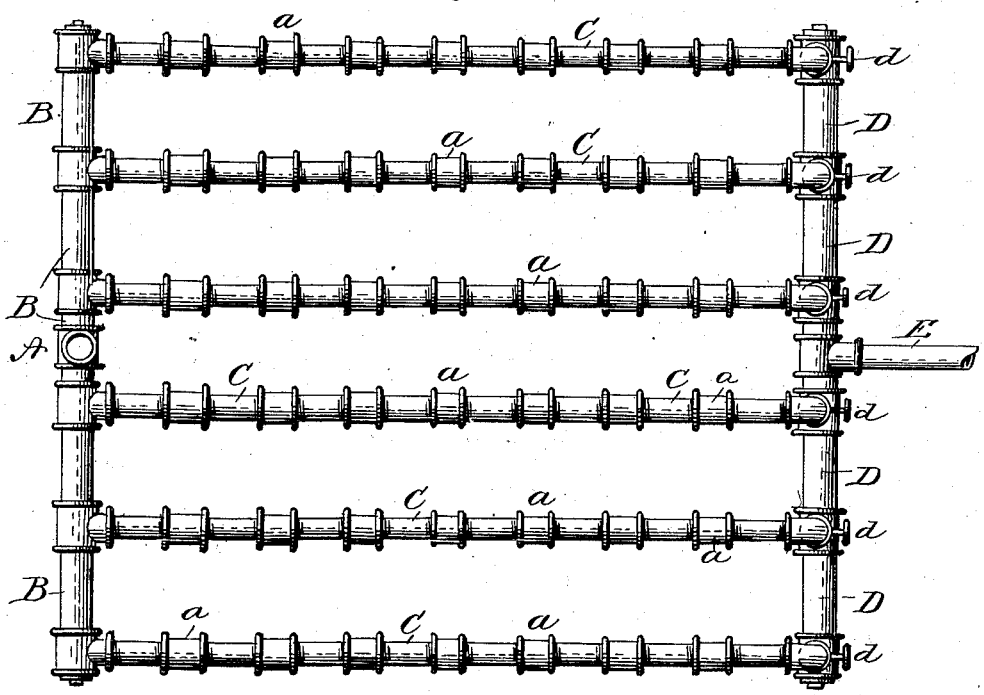

In the drawings, Figure 1 is a side elevation, and Fig. 2 is a plan, of the device in the form which I have found on the whole to be most convenient.

The structure of the device is such that it can be conveniently and economically made from ordinary iron pipe, T's, nipples, and elbows, such as are now in the market and in use.

A is the inflow-pipe for the material to be settled.

B is a header with which pipe A communicates. It is plugged at its ends.

D is another header, also plugged at its ends.

C represents branch pipes extending between and connecting the two headers, each pipe C being provided with a valve $d$ for the purpose of regulating and controlling the flow through it.

E is the effluent pipe from header D.

Each pipe C is provided throughout its length with a number of pendent pockets $b$, which conveniently can be made of piping united to the pipe C by T's $a$. These pockets are designed to catch the sediment from the liquid flowing through the pipe C. They are provided each with a valve $c$ at its lower end, through which the settlings can be drawn off and discharged. By proportioning the number and length of the branches C to the amount of material to be passed through the inlet-pipe A and by proper regulation of the valve $d$ any desired adjustment of volume and rate of flow can be obtained.

In operation the material to be settled enters by the inlet-pipe A into the header B, from which it flows into the branches C, during its passage through which the sediment which may be contained in the liquid will settle in and be caught by the pockets $b$. By means of the valves $d$ an equal flow through each branch C can be established, and at the same time the entire rate of flow can be controlled. The valves $c$ on the pockets $b$ are opened from time to time, and the more densely settled portion of the sediment therein contained is discharged into any suitable receptacle—as, for example, a trough F, Fig. 1—whence it is carried off for such further treatment as may be desired. The fluid portion of the material freed from sediment to the desired extent passes from the branches C into the header D and thence by the effluent or discharge pipe E to such uses as may be made of it.

The valves $c$ may, if desired, be connected by a rod or the like, so that they may all be opened and closed simultaneously. Mechanical contrivances of this kind are well known to the skilled mechanic and require no further description.

Care must be taken to have the pockets $b$ deep in proportion to cross-sectional area both in order that the settlings may not be distured by the current of liquid passing through the branches C and also that the denser sediment only may escape when the valves $c$ are opened. I have found a length of three (3) feet convenient in the case of cylindrical pockets of a diameter of four (4) inches.

The number and length of the branches C must of course be determined by the needs of each individual case. It will be noted that if the device be constructed, as shown, of ordinary piping it can be readily extended in either direction by lengthening the headers B and D and adding more branches C or by breaking the branches C at any joint and lengthening them.

I have described this settling device, as hereinbefore said, with more special reference to its use in connection with brine; but of course it can be used in connection with any liquid.

What I claim herein as new, and desire to secure by Letters Patent, is—

A settling device consisting of inlet and outlet headers, branches interposed between and connecting the same, and fitted with valves to control the flow between the headers, pendent pockets connected to and communicating with said branches at intervals along their length and means for opening and closing the bottoms or discharge ends of said pockets, substantially as and for the purposes hereinbefore set forth.

In testimony whereof I have hereunto set my hand this 22d day of September, 1902.

JOSEPH F. GENT.

Witnesses:
WINENT H. D. FOX,
ALFRED J. PARKER.